(12) United States Patent
Kurita et al.

(10) Patent No.: US 7,275,517 B2
(45) Date of Patent: Oct. 2, 2007

(54) INTAKE-AIR CONTROL DEVICE FOR INTERNAL COMBUSTION ENGINE

(75) Inventors: Kazuhisa Kurita, Tokyo (JP); Yoshihiko Onishi, Tokyo (JP); Takuya Uryu, Tokyo (JP); Tomoki Sagayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 13 days.

(21) Appl. No.: 11/377,295

(22) Filed: Mar. 17, 2006

(65) Prior Publication Data

US 2007/0068491 A1 Mar. 29, 2007

(30) Foreign Application Priority Data

Sep. 28, 2005 (JP) ............................ P2005-282084

(51) Int. Cl.
 *F02D 11/10* (2006.01)
 *G01B 7/30* (2006.01)

(52) U.S. Cl. ................. 123/399; 123/337; 324/207.21; 73/118.1

(58) Field of Classification Search ................ 123/336, 123/337, 399, 361, 403, 583; 324/207.2, 324/207.21, 207.25; 73/118.1, 118.2, 117.2, 73/117.3
See application file for complete search history.

(56) References Cited

U.S. PATENT DOCUMENTS 5,544,000 A * 8/1996 Suzuki et al. ............... 361/139
7,042,212 B2 * 5/2006 Yoshikawa et al. ..... 324/207.25
7,093,581 B2 * 8/2006 Wayama et al. ............ 123/399
7,210,451 B2 * 5/2007 Ikeda et al. ................. 123/399

FOREIGN PATENT DOCUMENTS

| JP | 2004-077472 A | 3/2004 |
| JP | 2004-332635 A | 11/2004 |

* cited by examiner

*Primary Examiner*—Willis R. Wolfe
*Assistant Examiner*—Johnny H. Hoang
(74) *Attorney, Agent, or Firm*—Sughrue Mion Pllc.

(57) ABSTRACT

An intake-air control device for an internal combustion engine in which a sensor member can be positioned further accurately is provided. A throttle position sensor includes magnetic field generating means and a magnetic field detecting assembly. The magnetic field detecting assembly includes a plurality of terminal leads, a resin holder secured on the plurality of terminal leads, a sensor member generating a sensor output, and a resin mold body including the plurality of terminal leads, the holder, and the sensor member insert-molded. The resin holder includes a supporting surface which is located on a plane intersecting substantially perpendicularly to an axial line of a throttle shaft, and the sensor member includes a resin mold coat having first and second main surfaces opposing substantially in parallel to each other. The sensor member is held in the resin mold body with the first main surface of the resin mold coat in contact with the supporting surface.

13 Claims, 10 Drawing Sheets

INTAKE-AIR CONTROL DEVICE FOR INTERNAL COMBUSTION ENGINE

BACKGROUND OF THE INVENTION

1. Field of the Invention

The present invention relates to an intake-air control device for an internal combustion engine.

2. Description of the Related Art

The intake-air control device for an internal combustion engine includes a throttle valve and a throttle position sensor. The throttle position sensor serves to detect the rotational position of the throttle valve, and recently, a non-contact throttle position sensor is integrated. The non-contact throttle position sensor is effective for improving durability and enhancing detection accuracy.

The non-contact throttle position sensor includes magnetic field generating means and a magnetic field detecting assembly. The magnetic field generating means rotates together with the throttle valve, and generates a detecting magnetic field in which the direction of magnetic field varies according to the rotation of the throttle valve. The magnetic field detecting assembly is fixed corresponding to the magnetic field generating means. The magnetic field detecting assembly includes a sensor member arranged in the detecting magnetic field, and the sensor member generates a detection output corresponding to the rotation in the direction of the magnetic field in the detecting magnetic field.

An intake-air control device for an internal combustion engine in which the non-contact throttle position sensor is integrated is disclosed in JP-A-2004-332635 as the related art. The throttle position sensor shown in the related art employs a magnetoresistive element (MR element) in the sensor member, and the sensor member is arranged inside a cylindrical holder and fixed therein by filling potting resin therein. The cylindrical holder is fixed on a printed board, and a detection output of the sensor member is supplied to a plurality of wirings on the printed board via a signal processing IC, whereby the plurality of wirings on the printed board are connected to a plurality of terminal leads introduced toward the outside.

In the throttle position sensor disclosed in the related art, the sensor member needs to be fixed in the cylindrical holder accurately in a predetermined direction. However, since the sensor member is fixed in the interior of the cylindrical holder with the potting resin, and there is no guiding member that guides the sensor member to the predetermined direction in this cylindrical holder, the direction of the sensor member may be varied and hence error may be generated in the detection output. Since the printed board is arranged between the cylindrical holder and the terminal leads, the number of components is increased, and a step of joining the signal processing IC and the wirings on the printed board and a step of joining the wirings on the printed board and the terminal leads are required in an assembly process.

SUMMARY OF THE INVENTION

Accordingly, it is an object of the present invention to provide an improved intake-air control device for an internal combustion engine in which error in a detection output is reduced, the number of components is reduced, and the number of steps of joining in an assembly process is reduced.

An intake-air control device for an internal combustion engine according to the invention is an intake-air control device for an internal combustion engine including a throttle valve and a throttle position sensor. The throttle valve controls the amount of intake-air into the internal combustion engine by being rotated about a throttle shaft arranged in an air-intake pipe of the internal combustion engine. The throttle position sensor detects the rotational position of the throttle valve, the throttle position sensor includes magnetic field generating means that rotates together with the throttle valve and generates a detecting magnetic field in which the direction of magnetic field varies according to the rotation thereof and a magnetic field detecting assembly arranged so as to oppose to the magnetic field generating means. The magnetic field detecting assembly of the throttle position sensor includes a plurality of terminal leads, a resin holder secured on the plurality of terminal leads, a sensor member arranged in the detecting magnetic field and generates a sensor output according to the direction of the magnetic field, and a resin mold body including the plurality of terminal leads, the resin holder and the sensor member are insert-molded. The resin holder has a supporting surface positioned on a plane intersecting substantially orthogonally to an axial line of the throttle shaft. The sensor member includes a resin mold coat having first and second main surfaces opposing substantially in parallel with each other. The sensor member is held in the resin mold body with the first main surface of the resin mold coat being in contact with the supporting surface of the resin holder.

In the intake-air control device for an internal combustion engine according to the invention, the resin holder includes the supporting surface positioned on the plane intersecting substantially orthogonally to the axial line of the throttle shaft and the sensor member includes the resin mold coat having the first and second main surfaces opposing substantially in parallel with each other and the sensor member is held in the resin mold body with the first main surface of the resin mold coat being in contact with the supporting surface. Therefore, displacement of the sensor member can be reduced, and hence the error in the detection output can be reduced. Since the resin holder is secured on the plurality of terminal leads, it is not necessary to use the printed board separately from the plurality of the terminal leads, and hence the number of components can be reduced, and the number of steps of joining can also be reduced.

DESCRIPTION OF THE PREFERRED EMBODIMENTS

Referring now to the drawings, some embodiments of the present invention will be described.

First Embodiment

Figure 1:
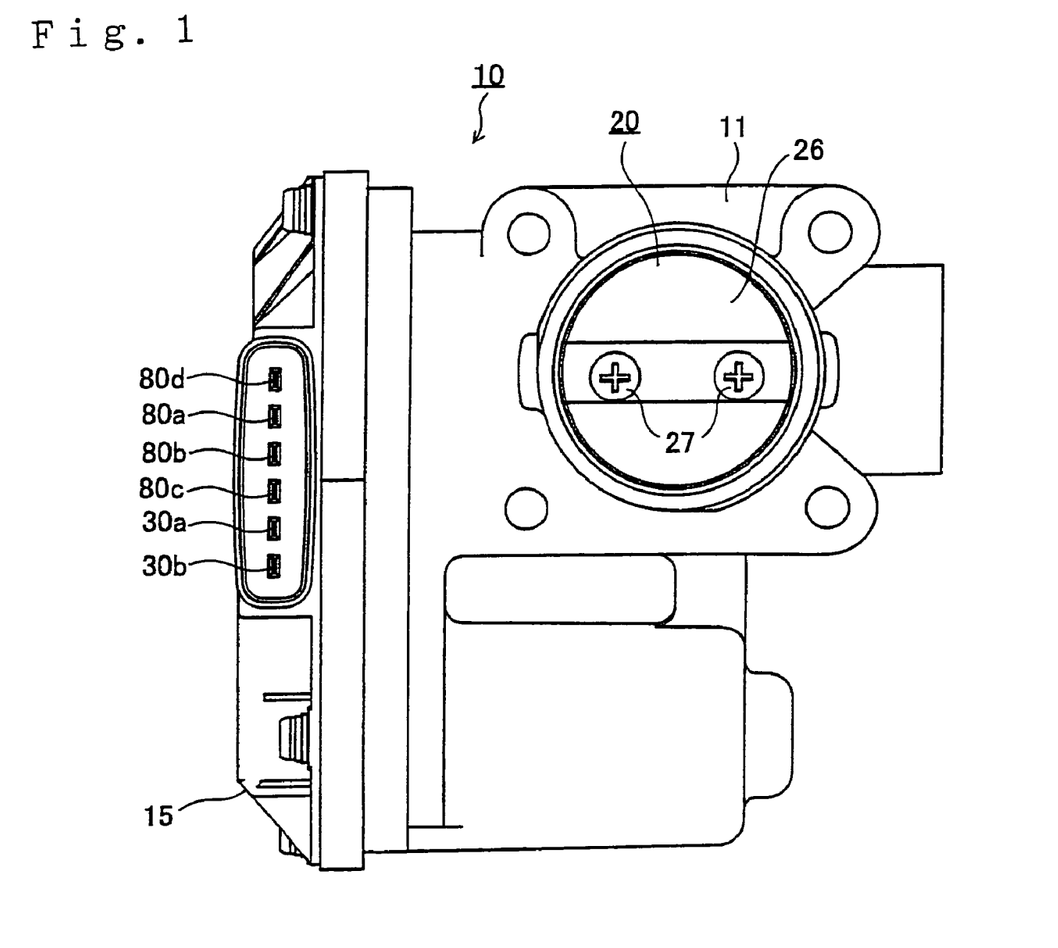
FIG. 1 is a front view showing a first embodiment of an intake-air control device for an internal combustion engine according to the invention.
Figure 2:
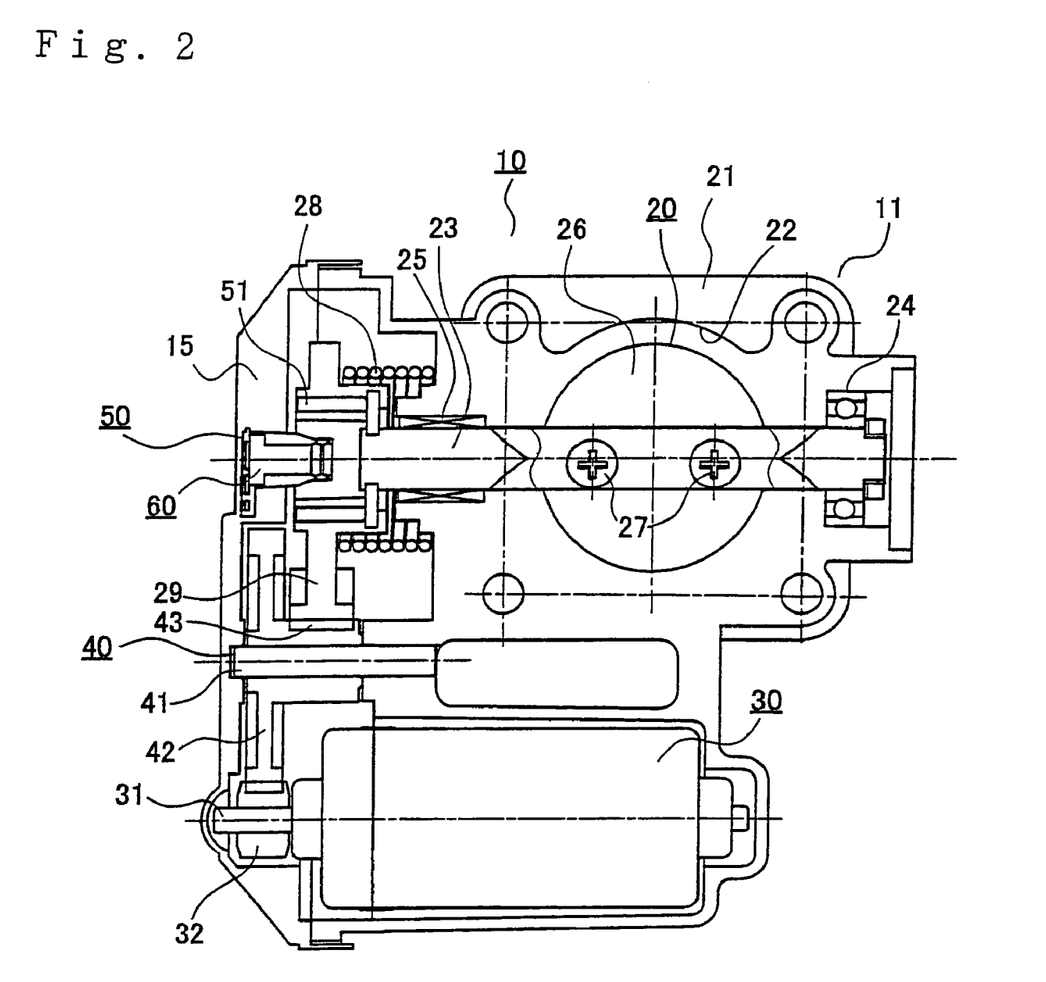
FIG. 2 is a vertical cross-sectional view showing a state in which part of FIG. 1 is left uncut.
Figure 3:
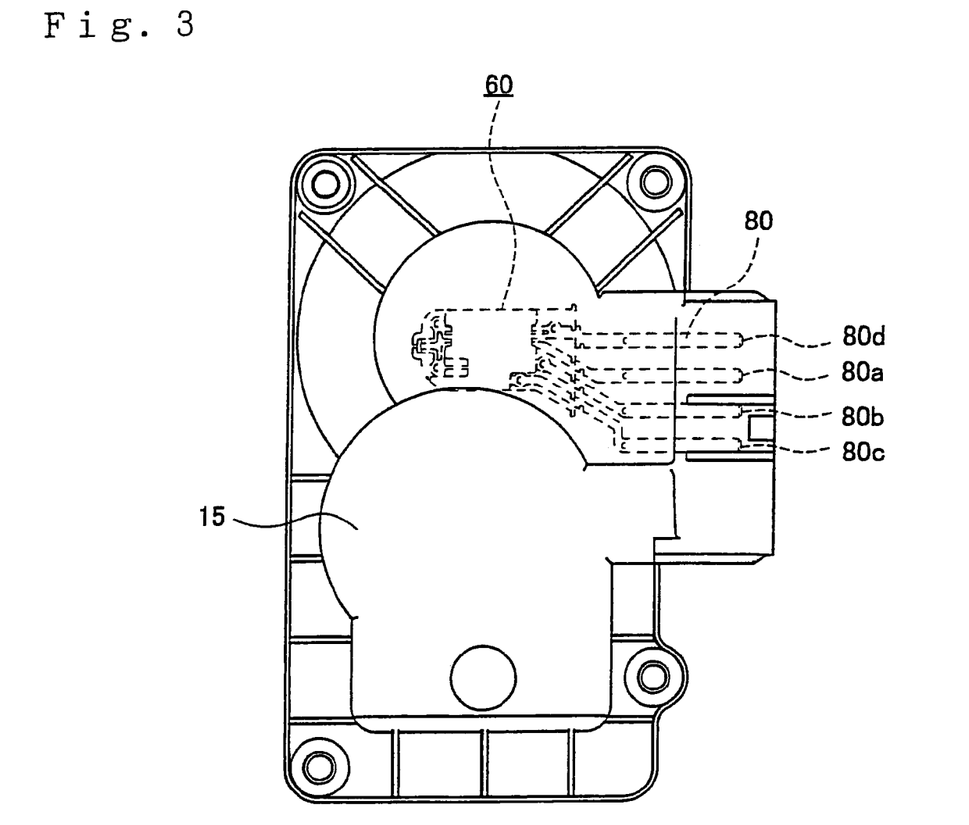
FIG. 3 is a side view of FIG. 1.
Figure 4:
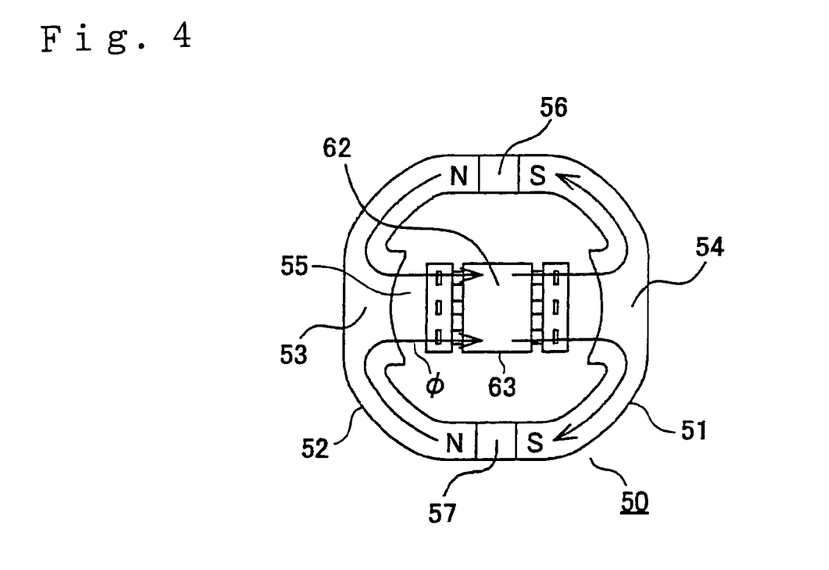
FIG. 4 is a front view of magnetic field generating means of a throttle position sensor in the first embodiment.
Figure 5:
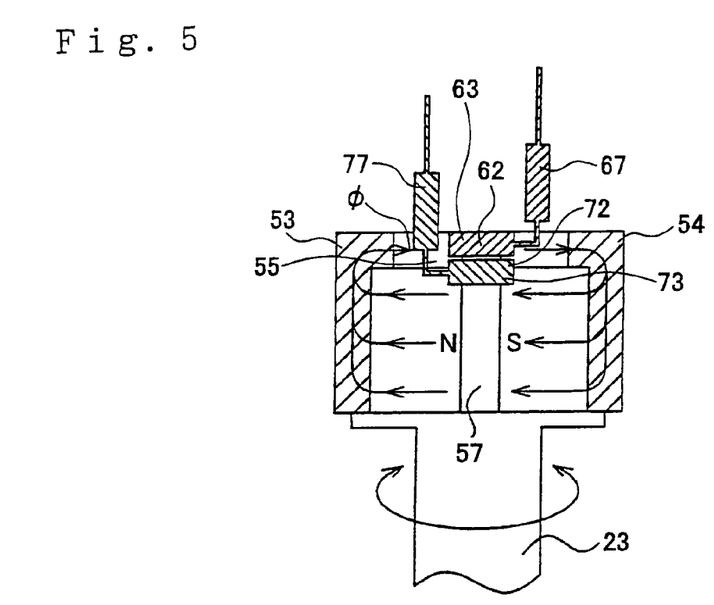
FIG. 5 is a cross-sectional view of FIG. 4.
Figure 6:
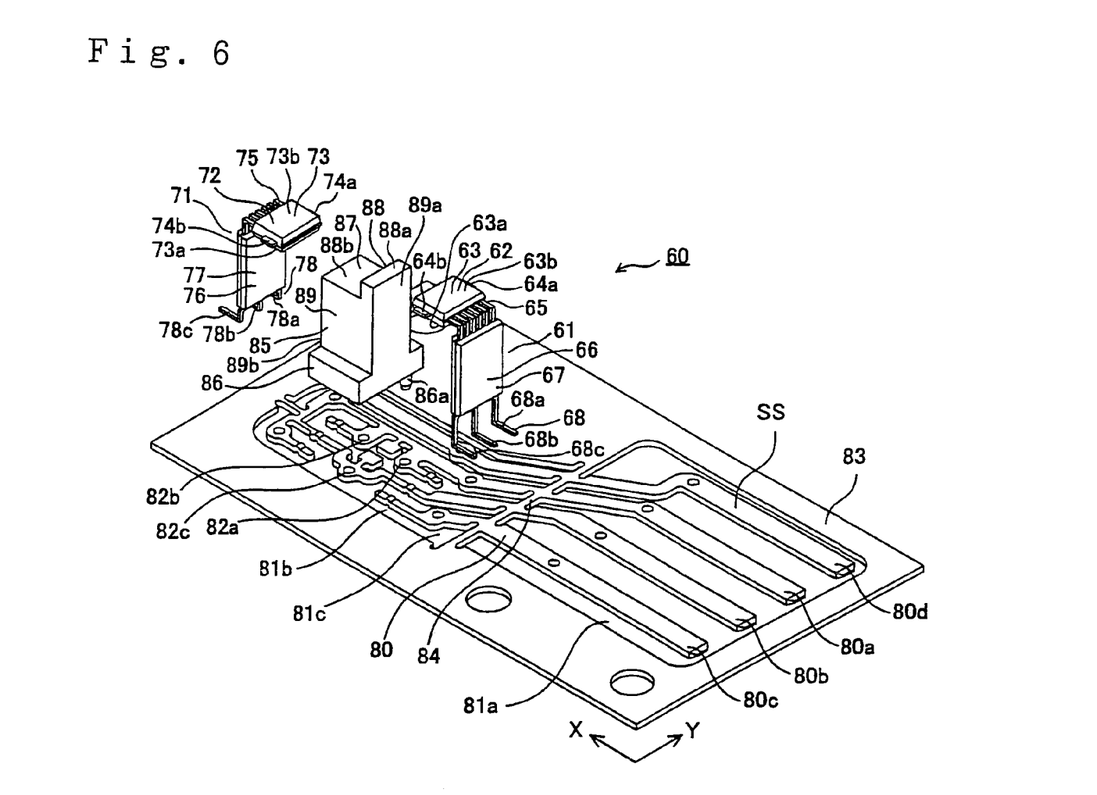
FIG. 6 is an exploded perspective view in an assembling step of a magnetic field detecting assembly of the throttle position sensor according to the first embodiment.
Figure 7:
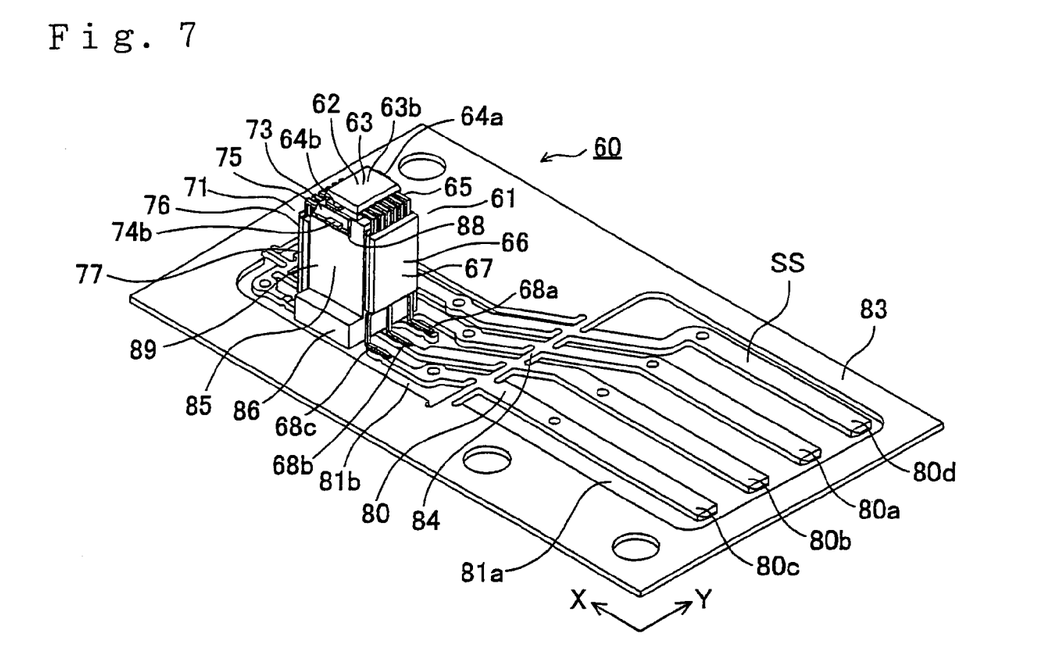
FIG. 7 is a perspective view of a stage in which assembly of the magnetic field detecting assembly of the throttle position sensor in the first embodiment is ended.
Figure 8:
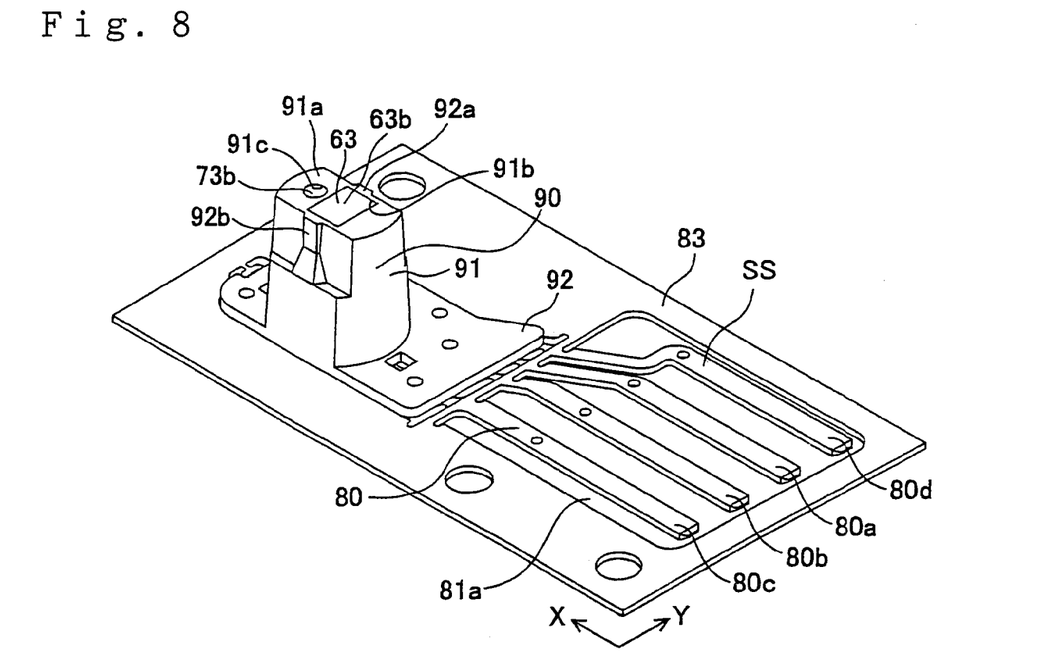
FIG. 8 is a perspective view of a stage in which resin mold of the magnetic field detecting assembly of the throttle position sensor in the first embodiment is ended.
Figure 9:
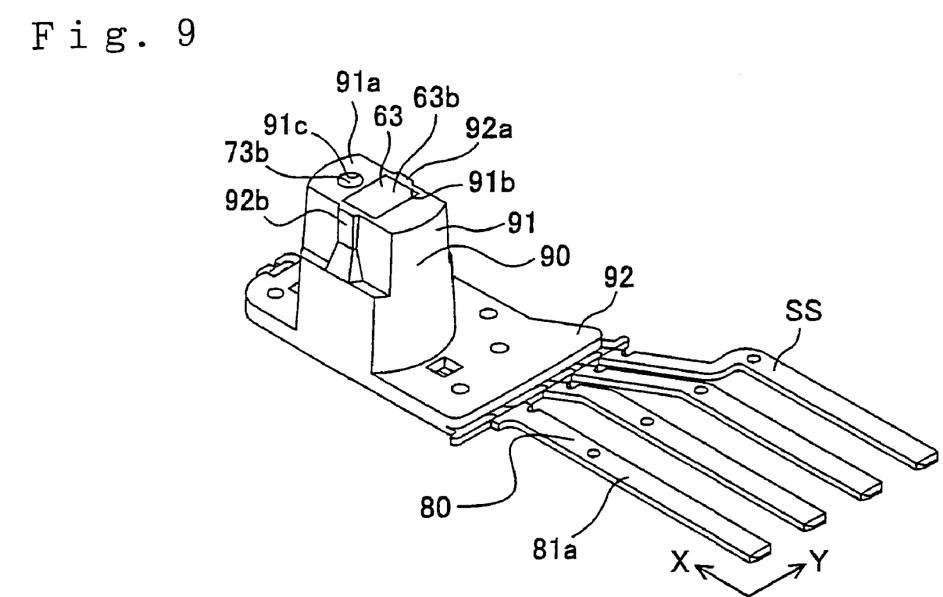
FIG. 9 is a perspective view showing a state in which the magnetic field detecting assembly of the throttle position sensor in the first embodiment is completed.
Figure 10:
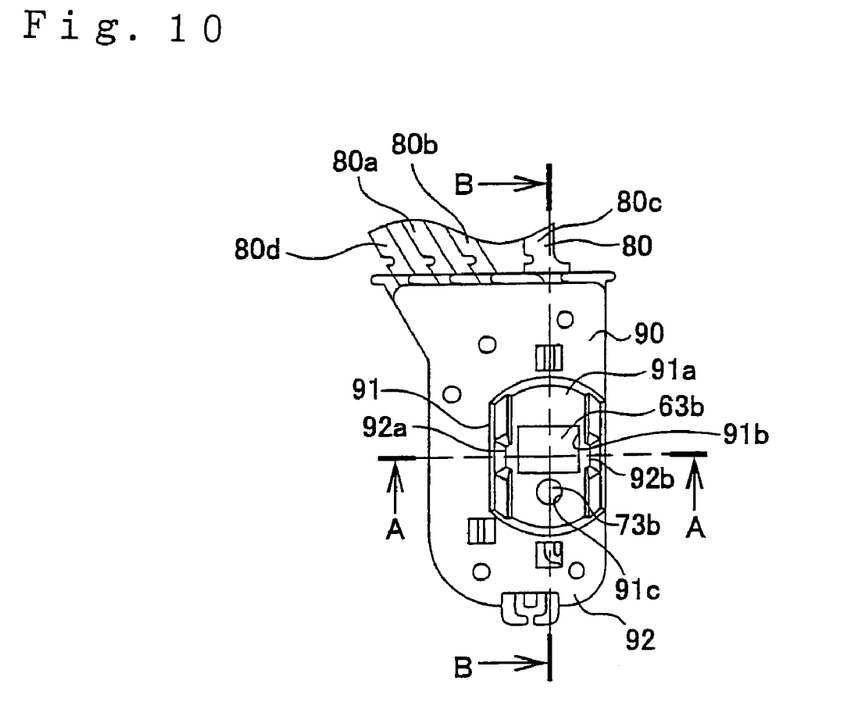
FIG. 10 is a side view showing a resin mold body of the magnetic field detecting assembly of the throttle position sensor in the first embodiment.
Figure 11:
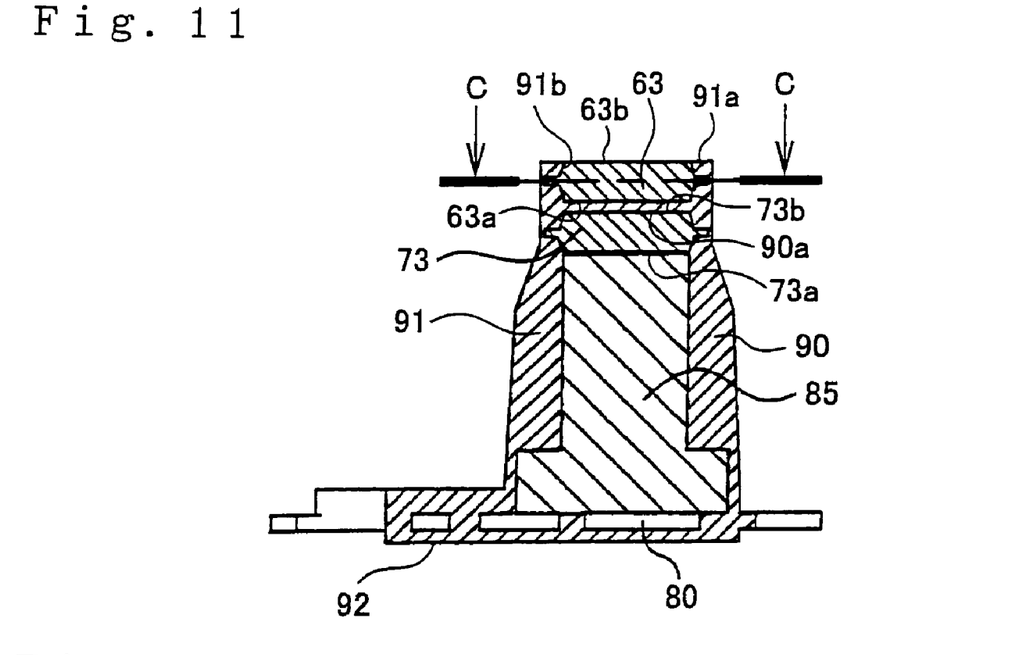
FIG. 11 is a cross-sectional view taken along the line A-A in FIG. 10.
Figure 12:
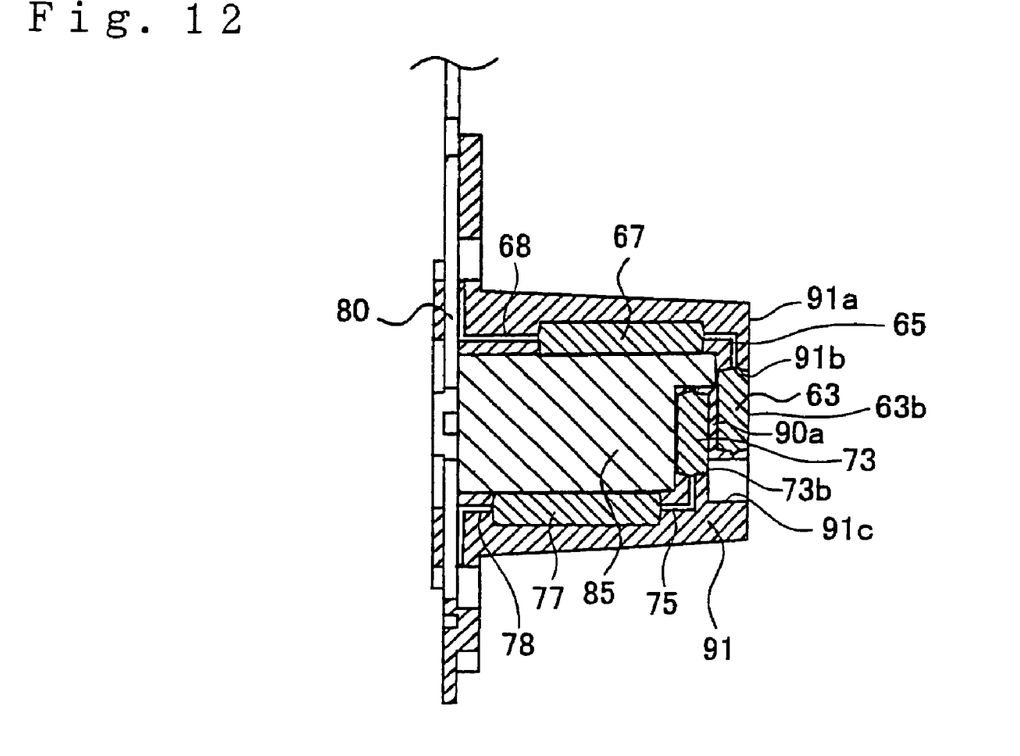
FIG. 12 is a cross-sectional view taken along the line B-B in FIG. 10.
Figure 13:
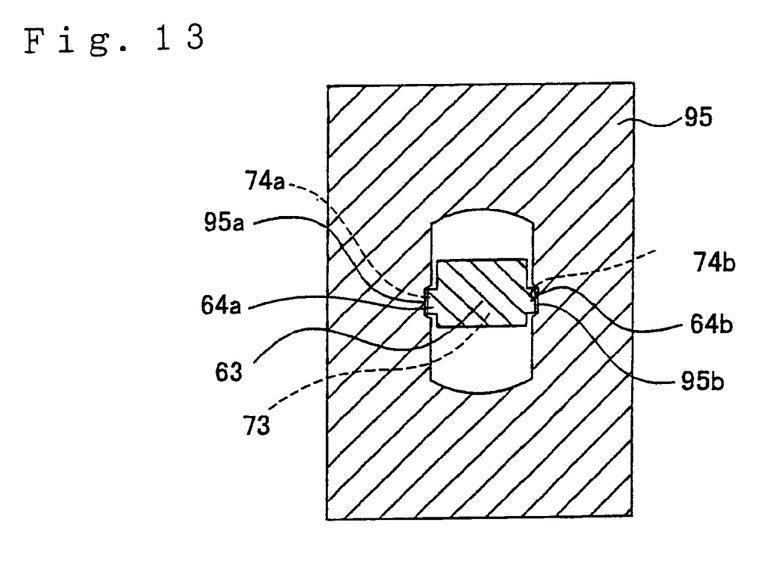
FIG. 13 is a cross-sectional view taken along the line C-C in FIG. 11.

FIG. 1 is a front view showing a first embodiment of an intake-air control device for an internal combustion engine according to the invention; FIG. 2 is a vertical cross-sectional view showing a state in which part of FIG. 1 is left uncut; FIG. 3 is a side view of FIG. 1; FIG. 4 is a front view of a principal portion of a throttle position sensor in the first embodiment; FIG. 5 is a cross-sectional view of FIG. 4; FIG. 6 is an exploded perspective view in an assembling step of a magnetic field detecting assembly of the throttle position sensor according to the first embodiment; FIG. 7 is a perspective view of a stage in which assembly of the magnetic field detecting assembly of the throttle position sensor in the first embodiment is ended; FIG. 8 is a perspective view of a stage in which resin mold of the magnetic field detecting assembly of the throttle position sensor in the first embodiment is ended; FIG. 9 is a perspective view showing a state in which the magnetic field detecting assembly of the throttle position sensor in the first embodiment is completed; FIG. 10 is a side view showing a resin mold body of the magnetic field detecting assembly of the throttle position sensor in the first embodiment; FIG. 11 is a cross-sectional view taken along the line A-A in FIG. 10; FIG. 12 is a cross-sectional view taken along the line B-B in FIG. 10; and FIG. 13 is a cross-sectional view taken along the line C-C in FIG. 11.

Referring now to FIG. 1, FIG. 2 and FIG. 3, the general structure of the intake-air control device for an internal combustion engine according to the first embodiment will be described. The intake-air control device for an internal combustion engine according to the first embodiment includes a case 10, and the case 10 includes a case body 11 and a cover 15. The case 10 includes a throttle valve assembly 20, a drive motor 30, a connecting mechanism 40, and magnetic field generating means 51 of a throttle position sensor 50 integrated therein.

In FIG. 1 and FIG. 2, the case body 11 is formed by die-casting aluminum, for example. The case body 11 includes the throttle valve assembly 20 and the magnetic field generating means 51 of the throttle position sensor 50 built in an upper part thereof, the drive motor 30 built in a lower part thereof, and the connecting mechanism 40 in an intermediate part thereof respectively. The case body 11 is opened only on a left side end, and the left side end of the case body 11 is covered by the cover 15. The cover 15 is formed by resin mold, and a magnetic field detecting assembly 60 of the throttle position sensor 50 is insert-molded in the cover 15.

The throttle valve assembly 20 includes an air-intake body 21, a throttle shaft 23, first and second bearings 24, 25, a throttle valve 26, a return coil spring 28, and a throttle gear 29. The air-intake body 21 is formed in the case body 11, and defines an air-intake passage 22 for the internal combustion engine. The air-intake passage 22 has a circular cross-section, and extends perpendicularly with respect to the plane of the drawings of FIG. 1 and FIG. 2.

The throttle shaft 23 is arranged so that the axis thereof intersects substantially orthogonally to the air-intake passage 22. The throttle shaft 23 is supported by the first and second bearings 24, 25 so as to be rotatable about the axis thereof. The first bearing 24 is arranged on a right side end of the throttle shaft 23. The first bearing 24 is composed of a ball bearing. The second bearing 25 is a metal bearing, and is arranged on a left side end of the throttle shaft 23.

The throttle valve 26 is formed of a disk plate having substantially the same size as the air-intake passage 22. The throttle valve 26 is arranged so as to extend across the air-intake passage 22. The throttle valve 26 is secured to the throttle shaft 23 by a screw 27, and rotates with the throttle shaft 23. The valve opening of the throttle valve 26 varies with the rotational position of the throttle valve 26 and the amount of intake-air into the internal combustion engine is controlled.

The return coil spring 28 gives a spring force which is applied against the rotation of the throttle shaft 23. The throttle gear 29 is mounted to the left end of the throttle shaft 23 so as to rotate with the throttle shaft 23. The return coil spring 28 is provided between the throttle gear 29 and the air-intake body 21. Both ends of the return coil spring 28 are fixed to the throttle gear 29 and the air-intake body 21.

The drive motor 30 is fixed to the lower part of the case body 11 so that a motor shaft 31 thereof extends in parallel with the throttle shaft 23. The drive motor 30 drives the throttle shaft 23 when it is energized, and increases the valve opening of the throttle valve 26 against the return coil spring 28. When the energization of the drive motor 30 is discontinued, the throttle valve 26 is returned to a position of the failsafe opening by the return coil spring 28. The motor shaft 31 of the drive motor 30 is provided with a motor gear 32.

The connecting mechanism 40 is arranged between the drive motor 30 and the throttle shaft 23, and transmits a drive force of the drive motor 30 to the throttle shaft 23. The connecting mechanism 40 includes an intermediate shaft 41, a first intermediate gear 42 and a second intermediate gear 43. The intermediate shaft 41 is arranged in parallel with the throttle shaft 23 and the motor shaft 31. The first intermediate gear 42 is engaged with the motor gear 32. The first intermediate gear 42 has a diameter larger than the motor gear 32 and is decelerated by the motor gear 32.

The second intermediate gear 43 is formed integrally with the first intermediate gear 42, and rotates with the first intermediate gear 42. The second intermediate gear 43 is engaged with the throttle gear 29. The second intermediate gear 43 has a diameter smaller than the throttle gear 29, and decelerates the throttle gear 29. The drive force of the drive motor 30 is transmitted to the throttle shaft 23 via the motor gear 32, the first and second intermediate gears 42, 43, and the throttle gear 29. The throttle gear 29, the motor gear 32, the first and second intermediate gears 42, 43 are formed, for example, of the resin material.

A throttle position sensor 50 includes the magnetic field generating means 51 arranged in the case body 11 and the magnetic field detecting assembly 60 insert-molded in the cover 15, and is arranged so as to be laid across the case body 11 and the cover 15. The magnetic field generating means 51 is arranged in an inner periphery of the throttle gear 29 of the throttle valve assembly 20, and rotates with the throttle gear 29. The magnetic field detecting assembly 60 is insert-molded in the cover 15, and is fixed to the cover 15.

The magnetic field generating means 51 of the throttle position sensor 50 includes a ring-shaped yoke 52 and a pair of magnets 56, 57 as shown in FIG. 4 and FIG. 5. The ring-shaped yoke 52 is concentric with the throttle shaft 23 and fitted in the inner periphery of the throttle gear 29 and rotates with the throttle gear 29. The yoke 52 includes a pair of magnetic poles 53, 54 opposing to each other on the inner periphery thereof and generates a detecting magnetic field 55 between the magnetic poles 53, 54.

The pair of magnets 56, 57 are permanent magnets and are integrated in the yoke 52. The magnets 56, 57 are arranged in polarities such that a N-pole is provided to the magnetic pole 53, and a S-pole is provided to the magnetic pole 54 and, consequently, a detecting magnetic flux Φ in the direction from the magnetic pole 53 toward the magnetic pole 54 is generated in the detecting magnetic field 55. The direction of the detecting magnetic flux Φ is oriented in the direction orthogonal to the axial line of the throttle shaft 23, and the direction of the detecting magnetic flux Φ rotates about the axial line according to the rotation of the throttle shaft 23.

The magnetic field detecting assembly 60 is shown in FIG. 6 to FIG. 13. The magnetic field detecting assembly 60 includes a sensor member 62 and an auxiliary sensor member 72 as principal parts. The sensor members 62, 72 include a magnetoresistive element (MR element) and a sensor IC molded respectively in resin mold coats 63, 73. The MR element and the sensor IC molded in the resin mold coats 63, 73 output a sensor output SD of the sensor members 62, 72, and the sensor output SD has a magnitude proportional to the direction of the detecting magnetic flux Φ, that is, the rotational position of the throttle shaft 23 and the throttle valve 26.

The sensor member 62 and the auxiliary sensor member 72 are configured into the same structure, and are arranged so as to generate the same sensor output SD. The sensor member 62 and the auxiliary sensor member 72 are arranged in duplicate as the failsafe specification, that is, so that when one of the sensor members is failed and hence abnormality occurs in the sensor output SD thereof, the sensor output SD of the other sensor member can be used.

In order to improve the accuracy of the sensor outputs SD of the sensor member 62 and the auxiliary sensor member 72, it is necessary to arrange the sensor member 62 and the auxiliary sensor member 72 accurately at predetermined positions. In the first embodiment, the magnetic field detecting assembly 60 is configured so that the sensor member 62 and the auxiliary sensor member 72 can be arranged accurately at predetermined positions.

Referring now to FIG. 6 to FIG. 13, the magnetic field detecting assembly 60 will be described in detail. The magnetic field detecting assembly 60 includes a sensor circuit structure 61, an auxiliary sensor circuit structure 71, a terminal lead structure 80, a resin holder 85, and a resin mold body 90, and is insert-molded in the cover 15 as shown in FIG. 6 and FIG. 7. The magnetic field detecting assembly 60 is assembled in reference to a reference plane SS which intersects perpendicularly to the axial line of the throttle shaft 23. The reference plane SS is defined by an upper surface of the terminal lead structure 80 as shown in FIG. 6 to FIG. 9. In FIG. 6 to FIG. 9, description will be made assuming directions X and Y which intersect at orthogonally to each other on the reference plane SS.

The sensor circuit structures 61, 71 are configured into the same structure as the failsafe specification. The sensor circuit structure 61 includes the sensor member 62, a first lead structure 65, a signal processing IC 66, and a second lead structure 68. In the same manner, the auxiliary sensor circuit structure 71 includes the auxiliary sensor member 72, a first lead structure 75, an auxiliary signal processing IC 76, and a second lead structure 78.

The sensor members 62, 72 include, as shown in FIG. 6 and FIG. 7, resin mold coats 63, 73 respectively, and the first lead structures 65, 75 are introduced from the resin mold coats 63, 73, respectively. The MR element and the sensor IC are molded in the resin mold coats 63, 73 respectively, and the MR element and the sensor IC are electrically connected to the first lead structures 65, 75 in a predetermined relation.

The first lead structures 65, 75 include a plurality of leads extending substantially in parallel to each other. All the leads extend in the X-direction. The plurality of leads includes one power source terminal lead, one GND terminal lead, and one output lead. The output lead generates the sensor output SD.

The resin mold coats 63, 73 have flat rectangular parallelepiped respectively, and are formed, for example, of epoxy resin. The resin mold coats 63, 73 are arranged so as to oppose to each other in the direction perpendicular to the reference plane SS. The resin mold coat 63 includes a lower first main surface 63a and an upper second main surface 63b which oppose in parallel to each other. In the same manner, the resin mold coat 73 includes a lower first main surface 73a and an upper second main surface 73b which oppose in parallel to each other. The first main surfaces 63a, 73a and the second main surfaces 63b, 73b are formed in parallel with the reference plane SS, and is located on a plane which intersects substantially orthogonally to the axial line of the throttle shaft 23. The first main surface 63a of the resin mold coat 63 opposes the second main surface 73b of the resin mold coat 73.

The resin mold coat 63 includes a pair of projections 64a, 64b projecting from a pair of side surfaces opposing in the Y-direction, and in the same manner, the resin mold coat 73 includes a pair of projections 74a, 74b projecting from the pair of side surfaces opposing in the Y-direction. The pair of projections 64a, 64b project in the directions opposite from each other in parallel to the first and second main surfaces 63a, 63b of the resin mold coat 63. The pair of projections 74a, 74b project in the directions opposite from each other in parallel to the first and second main surfaces 73a, 73b of the resin mold coat 73.

The widths of the resin mold coats 63, 73 in the Y-direction are the same. The projections 64a, 74a are formed at positions overlapping with each other with the intermediary of a distance in the direction perpendicular to the reference plane SS. In the same manner, the projections 64b, 74b are formed at positions overlapping with each other with the intermediary of a distance in the direction perpendicular to the reference plane SS. The length of projection in the Y-direction and the length in the X-direction of the pair of projections 64a, 64b and the pair of projections 74a, 74b are the same.

The first lead structures 65, 75 are, as shown in FIG. 6 and FIG. 7, bent at midsections thereof downwardly at a right angle toward a terminal lead structure 80, and connect the resin mold coats 63, 73 and the signal processing ICs 66, 76. The signal processing ICs 66, 76 are semiconductor integrated circuits for processing the signals of the sensor outputs SD from the sensor members 62, 72, respectively, and include resin mold coats 67, 77 respectively. The resin mold coats 67, 77 are formed, for example, of epoxy resin.

The second lead structures 68, 78 are introduced downward from the resin mold coats 67, 77 toward the terminal lead structure 80. The second lead structures 68, 78 each include three leads 68a-68c, 78a-78c which extend substantially in parallel to each other. The leads 68a, 78a constitute the source terminal, and are electrically connected to the leads which constitute the power source terminals of the first lead structures 65, 75. The leads 68b, 78b constitute the GND terminals, and are electrically connected to the leads which constitute the GND terminals of the first lead structures 65, 75. The lead 68c outputs an output A and the lead 78c outputs an output B. The outputs A and B are outputs from the sensor circuit structures 61, 71.

The terminal lead structure 80 includes, as shown in FIG. 6 to FIG. 9, four terminal leads 80a-80d aligned in parallel to each other. The terminal lead structure 80 constitutes an outer terminal of the magnetic field detecting assembly 60. The terminal lead 80a is a power source terminal lead, and for example, a direct current power source voltage of 5 Volts to the power source terminal lead 80a. The leads 68a, 78a of the second lead structures 68, 78 are connected to the power source terminal lead 80a, for example, by electric welding. The direct current power source voltage of 5 Volts supplied to the power source terminal lead 80a is supplied to leads 68a, 78a of the second lead structures 68, 78. The terminal lead 80b is the GND terminal lead, and is connected to a common potential point. The leads 68b, 78b of the second lead structures 68, 78 are connected to the terminal lead 80b, for example, by electric welding. A GND potential common to the leads 68b, 78b of the second lead structures 68, 78 is provided by the terminal lead 80b.

As shown in FIG. 6 and FIG. 7, the terminal lead structure 80 includes a terminal leading section 81a and a mounting section 81b for the sensor circuit structures 61, 71, and the terminal leads 80a-80d extend across the terminal leading section 81a and the mounting section 81b. The terminal leads 80a-80d extend substantially in the X-direction in the terminal leading section 81a and the mounting section 81b, and are connected with respect to each other by an inclined section 81c between the terminal leading section 81a and the mounting section 81b. Three mounting holes 82a-82c for mounting the resin holder 85 are formed on the terminal leads 80a, 80b positioned in the mounting section 81b. The mounting holes 82a, 82b are formed on the terminal lead 80a, and the mounting hole 82c is formed on the terminal lead 80b.

The terminal leads 80c, 80d of the terminal lead structure 80 are output terminal leads and arranged on both outsides so as to sandwich the terminal leads 80a, 80b. The lead 68c of the second lead structure 68 is connected to the terminal lead 80c, for example, by electric welding, and the output A of the sensor circuit structure 61 is supplied to the terminal lead 80c. The lead 78c of the second lead structure 78 is connected to the terminal lead 80d for example, by electric welding and the output B of the auxiliary sensor circuit structure 71 is supplied to the terminal lead 80d.

The resin holder 85 is formed, for example, of nylon resin into the shape of a square pole as shown in FIG. 6 and FIG. 7. The resin holder 85 integrally includes a lower base portion 86, an upper supporting portion 87, and an intermediate supporting portion 89 between them. Three positioning projections 86a are integrally formed on a lower surface of the lower base portion 86. The holder 85 is mounted to the mounting section 81b of the terminal lead structure 80 by inserting the positioning projections 86a into the mounting holes 82a-82c and is caulked by heat.

The upper supporting portion 87 of the holder 85 is formed with a shoulder 88. The shoulder 88 is formed with a supporting surface 88a and an auxiliary supporting surface 88b extending in parallel to each other. The supporting surface 88a is formed on an upper side of the shoulder 88, and the auxiliary supporting surface 88b is formed on a lower side thereof. The supporting surfaces 88a, 88b extend in parallel with the reference plane SS, and are positioned on a plane intersecting substantially orthogonally to the axial line of the throttle shaft 23. The intermediate supporting portion 89 is formed into the shape of a square column, and includes a pair of second supporting surfaces 89a, 89b opposing to each other in the X-direction. The second supporting surfaces 89a, 89b extend perpendicularly to the reference plane SS and positioned on a plane substantially in parallel with the axial line of the throttle shaft 23.

The resin mold coat 63 of the sensor circuit structure 61 is supported by the holder 85 in a state of being in contact with the supporting surface 88a. The resin mold coat 73 of the auxiliary sensor circuit structure 71 is supported by the holder 85 in a state of being in contact with the auxiliary supporting surface 88b. More specifically, the resin mold coat 63 is supported by the holder 85 in a state in which the first main surface 63a is in surface contact with the supporting surface 88a. The resin mold coat 73 is supported by the holder 85 in a state in which the first main surface 73a is in surface contact with the auxiliary supporting surface 88b. The resin mold coats 63, 73 come into surface contact with the supporting surface 88a and the auxiliary supporting surface 88b respectively and oppose to each other perpendicularly to the reference plane SS.

The resin mold coats 67, 77 of the sensor circuit structures 61, 71 are supported by the holder 85 in a state of being in contact with the intermediate supporting portion 89 of the holder 85. More specifically, the resin mold coat 67 is supported by the holder in a state of being in surface contact with one second supporting surface 89a of the intermediate supporting portion 89 and the resin mold coat 77 is supported by the holder in a state of being in surface contact with that other second supporting surface 89b of the intermediate supporting portion 89.

A resin mold body 90 is formed of resin material having a coefficient of linear expansion approximate to that of the resin mold coats 63, 67, 73, 77 of the sensor circuit structures 61, 71, for example, the epoxy resin which is the same material as the resin mold coats 63, 67, 73, 77. The resin mold body 90 includes a cylindrical portion 91 and a lower plate portion 92 as shown in FIG. 8 and FIG. 9. The lower plate portion 92 is formed entirely on the surface of the mounting section 81b of the terminal lead structure 80. The lower plate portion 92 is formed across an upper surface and a lower surface of the mounting section 81b of the terminal lead structure 80, and the terminal lead structure 80 is insert-molded on the lower plate portion 92. The lower plate portion 92 connects the respective terminal leads 80a-80d of the mounting section 81b to each other.

The cylindrical portion 91 is formed on the lower plate portion 92. The cylindrical portion 91 is formed so as to integrally connect the sensor circuit structures 61, 71 and the resin holder 85. The sensor circuit structures 61, 71 and the resin holder 85 are insert-molded in the cylindrical portion 91. In particular, the sensor circuit structures 61, 71 are insert-molded in the cylindrical portion 91 in a state in which the first main surfaces 63a, 73a of the resin mold coats 63, 73 are in surface contact with the supporting surface 88a and the auxiliary supporting surface 88b, and the resin mold coats 67, 77 are in surface contact with the second supporting surfaces 89a, 89b, respectively.

Subsequently, the manufacturing process of the magnet field detecting assembly 60 will be described referring again to FIG. 6 to FIG. 13. In FIG. 6, the sensor circuit structures 61, 71, the terminal lead structure 80, and the resin holder 85 in a state before assembly are shown. It should be understood that the terminal lead structure 80 includes an outer frame 83 and a plurality of connecting strips 84 integrally in the state before assembly shown in FIG. 6. The outer frame 83 is formed so as to surround the respective terminal leads 80a-80d of the terminal lead structure 80, and the plurality of connecting strips 84 connect the respective terminal leads 80a-80d with respect each other, and between the terminal leads 80c, 80d and the outer frame 83. The terminal lead structure 80 holds the respective terminal leads 80a-80d integrally to each other by the outer frame 83 and the plurality of connecting strips 84.

In the state shown in FIG. 6, the resin holder 85 is firstly positioned and mounted to the mounting section 81b of the terminal lead structure 80. Mounting of the holder 85 is performed by inserting the positioning projections 86a into the mounting holes 82a-82c, and caulking by heat.

After having mounted the resin holder 85 to the terminal lead structure 80, the sensor circuit structures 61, 71 are secured to the terminal lead structure 80. The sensor circuit structure 61 is secured to the terminal lead structure 80 by electrically welding the three leads 68a-68c of the second lead structure 68 to the terminal leads 80a-80c respectively in the mounting section 81b of the terminal lead structure 80 in a state in which the first main surface 63a of the resin mold coat 63 is in surface contact with the supporting surface 88a of the holder 85 and the resin mold coat 67 is in surface contact with the second supporting surface 89a respectively. Likewise, the sensor circuit structure 71 is secured to the terminal lead structure 80 by electrically welding the three leads 78a-78c of the second lead structure 78 to the terminal leads 80a, 80b, 80d respectively in the mounting section 81b of the terminal lead structure 80 in a state in which the first main surface 73a of the resin mold coat 73 is in surface contact with the auxiliary supporting surface 88b of the holder 85 and the resin mold coat 77 is in surface contact with the second supporting surface 89b respectively.

FIG. 7 shows a state in which assembly of the sensor circuit structures 61, 71, the terminal lead structure 80, and the holder 85 is completed. In the completely assembled state shown in FIG. 7, the resin mold body 90 is molded as shown in FIG. 8. In FIG. 8, a stage in which the molding process of forming the resin mold body 90 is ended is shown. In the state in which the resin mold body 90 is formed, the outer frame 83 and the plurality of connecting strips 84 of the terminal lead structure 80 are removed. Since the resin mold body 90 connects the terminal leads 80a-80d, the terminal leads 80a-80d do not come apart from each other. The terminal leads 80a-80d are electrically separated and become independent by removal of the plurality of connecting strips 84. The completed magnetic field detecting assembly 60 is shown in FIG. 9.

Referring to FIG. 10 to FIG. 12, the internal structure of the cylindrical portion 91 of the resin mold body 90 will be described further in detail. FIG. 10 shows the resin mold body 90. In FIG. 10, a rectangular exposure hole 91b is formed on an end surface 91a which is located on top of the cylindrical portion 91. The exposure hole 91b exposes a principal portion of the second main surface 63b of the resin mold coat 63 in the sensor circuit structure 61 from the resin mold body 90. The principal portion of the second main surface 63b of the resin mold coat 63 exposed through the exposure hole 91b comes into surface contact with the inner surface of a mold die 95 in the molding process for forming the resin mold body 90 so that the position of the resin mold coat 63 is constrained and prevented from moving between the mold die 95 and the supporting surface 88a. The positional constraint is effective for preventing the resin mold coat 63 from being displaced with respect to the direction of the detecting magnetic flux Φ.

In FIG. 10, the end surface 91a positioned on top of the cylindrical portion 91 is formed with a circular exposure hole 91c. The exposure hole 91c exposes part of the second main surface 73b of the resin mold coat 73 in the auxiliary sensor circuit structure 71 from the resin mold body 90 as shown in FIG. 11 and FIG. 12. The second main surface 73b of the resin mold coat 73 exposed from the exposure hole 91c comes into surface contact with a pin formed on the inner surface of the mold die 95, and constrains the position of the resin mold coat 73 so as not to move between the pin on the mold die 95 and the auxiliary supporting surface 88b in the molding process for molding the resin mold body 90. The positional constraint is effective for preventing the resin mold coat 73 from being displaced with respect to the direction of the detecting magnetic flux Φ.

A resin part 90a of the resin mold body 90 is injected into a portion between the resin mold coats 63 and 73 of the sensor circuit structures 61, 71 as shown in FIG. 11 and FIG. 12. The resin part 90a is filled between the resin mold coats 63 and 73 when molding the resin mold body 90 for pressing the principal portion of the second main surface 63b of the resin mold coat 63 against the inner surface of the mold die 95, and pressing the first main surface 73a of the resin mold coat 73 against the auxiliary supporting surface 88b. Pressing by the resin part 90a is effective for constraining the positions of the resin mold coats 63, 73 and is effective for preventing the resin mold coats 63, 73 from being displaced with respect to the direction of the detecting magnetic flux Φ.

The mold die 95 includes a pair of opposing position constraining grooves 95a, 95b at positions opposing to the pairs of projections 64a, 64b, 74a, 74b of the resin mold coats 63, 73 as specifically shown in FIG. 13. The pair of position constraining grooves 95a, 95b extend toward the terminal lead structure 80 perpendicularly to the reference plane SS. The projections 64a, 74a are fitted to the position constraining groove 95a, and the projections 64b, 74b are fitted to the position constraining groove 95b both tightly. The positional constraint of the projections 64a, 64b, 74a, 74b by the position constraining grooves 95a, 95b is effective for preventing the resin mold coats 63, 73 from being displaced with respect to the direction of the detecting magnetic flux Φ. As shown in FIG. 8, FIG. 9, and FIG. 10, projecting ridges 92a, 92b formed by the pair of position constraining grooves 95a, 95b on an upper peripheral surface of the cylindrical portion 91 of the resin mold body 90.

Terminal leads 30a, 30b of the drive motor 30 is insert-molded with the terminal lead structure 80 of the magnetic field detecting assembly 60 in the cover 15 as shown in FIG. 1. The terminal leads 30a, 30b are aligned with the terminal leads 80a-80d and arranged in the lower portion thereof. The terminal leads 30a, 30b are connected to the drive motor 30 via contacts, not shown, and supply drive voltage to the drive motor 30 as needed.

As described above, in the intake-air control device for an internal combustion engine according to the first embodiment of the present invention, the magnetic field detecting assembly 60 of the throttle position sensor 50 includes the plurality of terminal leads 80a-80d, the resin holder 85 secured on the plurality of terminal leads 80a-80d, at least one sensor member 62 that is arranged in the detecting magnetic field 55 and generates the sensor output SD according to the direction of the magnetic field, and the resin mold body 90 in which the plurality of terminal leads 80a-80d, the holder 85, and the sensor member 62 are insert-molded; the resin holder 85 includes the supporting surface 88a positioned on the plane which intersects substantially perpendicularly to the axial line of the throttle shaft 23; the sensor member 62 includes the resin mold coat 63 having the opposing the first and second main surfaces 63a, 63b; and the first main surface 63a is held in the resin mold body 90 in contact with the supporting surface 88a of the resin holder 85. In the magnetic field detecting assembly 60, since the first main surface 63a of the sensor member 62 is positioned in contact with the supporting surface 88a of the resin holder 85, the sensor member 62 is prevented from being displaced with respect to the magnetic field generating means 51, and hence further accurate detection of the throttle position is achieved.

According to the magnetic field detecting assembly 60 in the first embodiment, the sensor member 62 includes the pair of projections 64a, 64b projecting in the direction in parallel to the first and second main surfaces 63a, 63b from the resin mold coat 63, and the pair of projections project from the resin mold coat 63 in the directions opposite from each other. Therefore, by positioning the pair of projections 64a, 64b, for example, in the mold die 95, the sensor member 62 can be positioned more accurately.

According to the magnetic field detecting assembly 60 in the first embodiment, since at least part of the second main surface 63b of the sensor member 62 is exposed from the resin mold body 90, by positioning the second main surface 63b of the sensor member 62 in abutment, for example, with the mold die 95, the sensor member 62 can be positioned more accurately.

The magnetic field detecting assembly 60 in the first embodiment further includes a signal processing IC 66 connected to the sensor member 62, and the resin holder 85 includes the second supporting surface 89a positioned in the plane which extends substantially in parallel to the axial line of the throttle shaft 23, and then the signal processing IC 66 is held in the resin mold body 90 in contact with the second supporting surface 89a of the resin holder 85, the signal processing IC 66 can also be positioned further accurately.

The magnetic field detecting assembly 60 in the first embodiment further includes the auxiliary sensor member 72 arranged in the detecting magnetic field 55; the resin holder 85 includes the auxiliary supporting surface 88b which extends substantially in parallel to the supporting surface 88a; and the auxiliary sensor member 72 includes the resin mold coat 73 having the opposing first and second main surfaces 73a, 73b and held in the resin mold body 90 with the first main surface 73a in contact with the auxiliary supporting surface 88b. Therefore, the positional displacement of the auxiliary sensor member 72 with respect to the magnetic field generating means 51 is prevented, and hence further accurate detection of the throttle position is enabled.

According to the magnetic field detecting assembly 60 in the first embodiment, the resin mold coat 73 of the auxiliary sensor member 72 is arranged so as to oppose to the resin mold coat 63 of the sensor member 62, and the resin mold body 90 is filled in the space between the resin mold coat 63 of the sensor member 62 and the resin mold coat 73 of the auxiliary sensor member 72. Therefore, further accurate positioning of both of the sensor members 62, 72 is achieved.

According to the magnetic field detecting assembly 60 in the first embodiment, since the resin mold body 90 includes the exposure hole 91b for exposing at least part of the second main surface 63b of the sensor member 62, and the resin mold body 90 includes the exposure hole 91c for exposing part of the second main surface 73b of the resin mold coat 73 of the auxiliary sensor member 72, positioning the second main surface 63b of the sensor member 62 in abutment, for example, with the mold die 95, and positioning the second main surface 73b of the auxiliary sensor member 72 in abutment with the pin of the mold die 95, further accurate positioning of the sensor member 62 and the auxiliary sensor member 72 is achieved.

According to the magnetic field detecting assembly 60 in the first embodiment, since the resin mold coat 63 has the coefficient of linear expansion which is approximate to that of the resin mold body 90, a thermal stress applied between the resin mold coat 63 and the resin mold body 90 according to the difference of the coefficients of the linear expansion thereof on the basis of a thermal change during manufacturing or operation can be reduced, and positional displacement of the sensor member 62 caused by the thermal stress can be prevented.

Since the magnetic field detecting assembly 60 in the first embodiment includes positioning means 82a-82c, 86a for positioning at least one of the terminal leads of the plurality of terminal leads 80a, 80b and the resin holder 85, the resin holder 85 can be positioned on the terminal lead, and then the sensor member 62 can be positioned by the resin holder 85.

According to the magnetic field detecting assembly 60 in the first embodiment, the positioning means includes the positioning projection 86a formed on the resin holder 85, and the positioning projection 86a is caulked to at least one terminal lead by heat. Therefore, positioning of the resin holder 85 can be achieved easily.

Second Embodiment

Referring now to FIG. 14 to FIG. 19, a second embodiment of the intake-air control device for an internal combustion engine according to the invention will be described.

Figure 14:
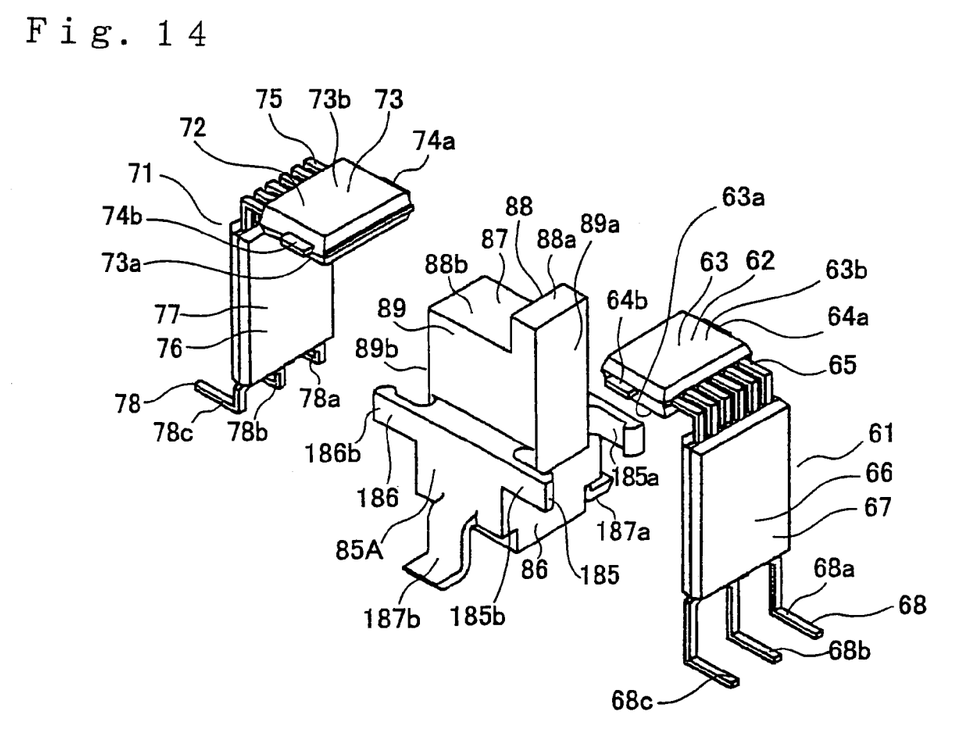
FIG. 14 is a perspective view of the intake-air control device for an internal combustion engine in a second embodiment of the invention showing a state before assembly of a sensor circuit structure of the magnetic field detecting assembly and a resin holder.
Figure 15:
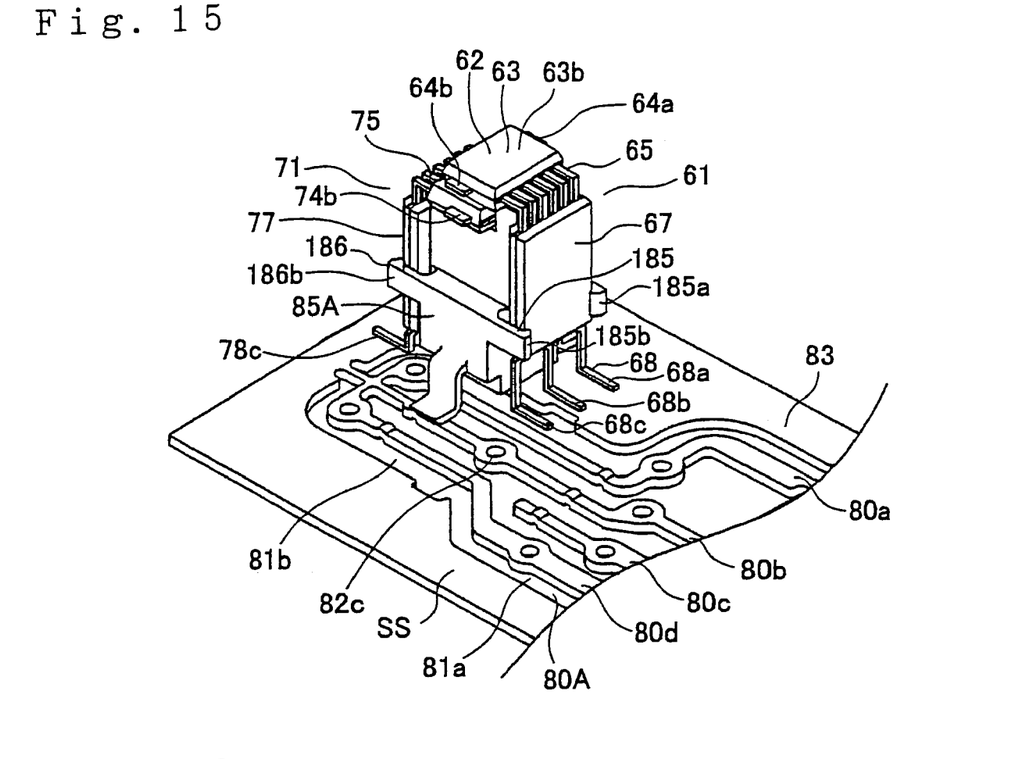
FIG. 15 is a perspective view showing a state before assembly of the sensor circuit structure of a magnetic field detecting assembly of the throttle position sensor and the resin holder to a terminal lead structure according to the second embodiment.
Figure 16:
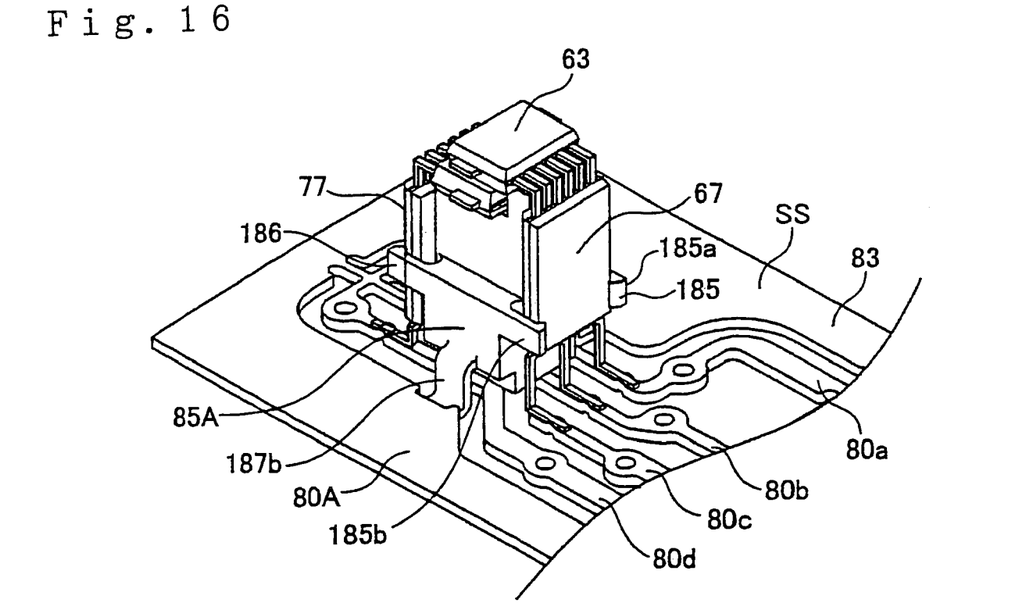
FIG. 16 is a perspective view showing a state in which assembly of the magnetic field detecting assembly of the throttle position sensor is completed according to the second embodiment.
Figure 17:
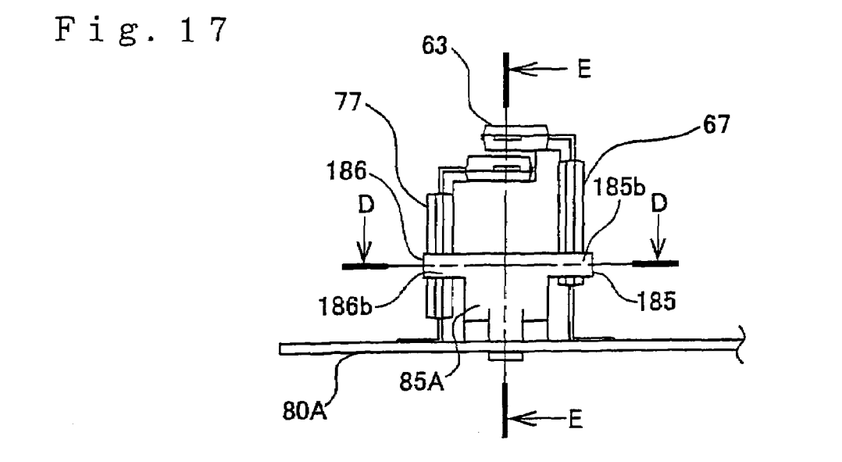
FIG. 17 is a front view showing a state in which the magnetic field detecting assembly shown in FIG. 16 is completed.
Figure 18:
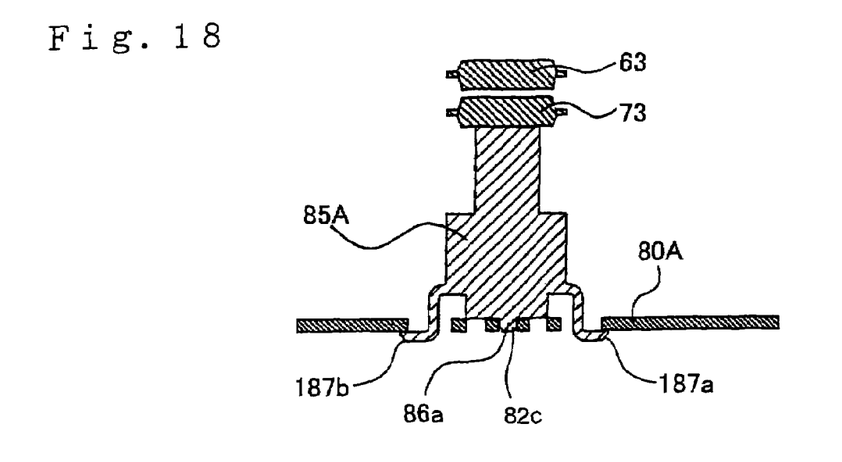
FIG. 18 is a cross-sectional view taken along the line E-E in FIG. 17.
Figure 19:
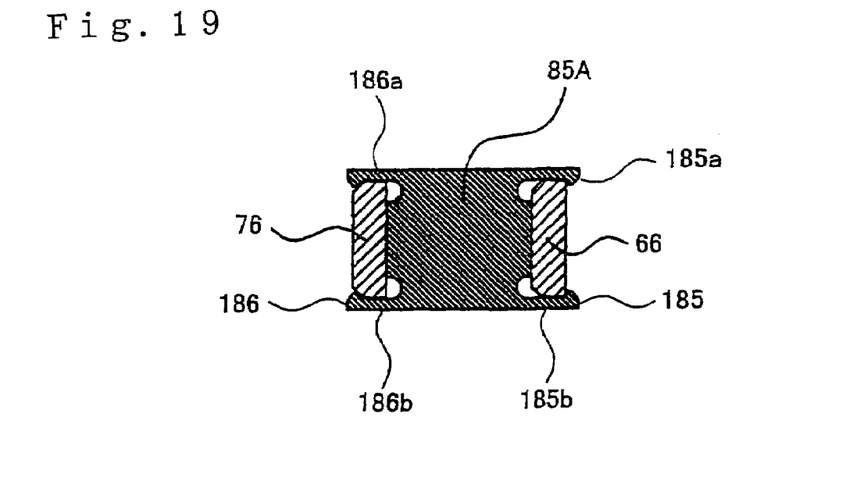
FIG. 19 is a cross-sectional view taken along the line D-D in FIG. 17.

FIG. 14 is a perspective view showing a state before assembly of a sensor circuit structure of a magnetic field detecting assembly and a resin holder according to the second embodiment; FIG. 15 is a perspective view showing a state before assembly of the sensor circuit structure and the resin holder to a terminal lead structure according to the second embodiment; FIG. 16 is a perspective view showing a state in which assembly of the magnetic field detecting assembly of a throttle position sensor is completed according to the second embodiment; FIG. 17 is a front view showing a state in which the magnetic field detecting assembly shown in FIG. 16 is completed; FIG. 18 is a cross-sectional view taken along the line E-E in FIG. 17; and FIG. 19 is a cross-sectional view taken along the line D-D in FIG. 17. All the drawings from FIG. 14 to FIG. 19 show a stage before molding the resin mold body 90.

According to the throttle position sensor 50 in the second embodiment, a magnetic field detecting assembly 60A in which the magnetic field detecting assembly 60 in the first embodiment is deformed is used, and in this magnetic field detecting assembly 60A, a resin holder 85A in which the resin holder 85 in the first embodiment is deformed, and a terminal lead structure 80A in which the terminal lead structure 80 is deformed are used. Other structures are the same as in the first embodiment.

The resin holder 85A used in the magnetic field detecting assembly 60A in the second embodiment includes holding portions 185, 186 for holding the respective signal processing ICs 66, 76 of the sensor circuit structures 61, 71, and also a pair of snap strips 187a, 187b for snap-fitting the holder 85A to the terminal lead structure 80A.

The resin holder 85A is formed, for example, of nylon resin into the shape of a square pole, and integrally includes the lower base portion 86, the upper supporting portion 87, and the intermediate supporting portion 89 as in the case of the resin holder 85 in the first embodiment. The holding portions 185, 186 are integrally formed with the intermediate supporting portion 89 on the supporting surfaces 89a, 89b of the intermediate supporting portion 89. The holding portions 185, 186 include pairs of opposing holding arms 185a, 185b and 186a, 186b respectively, and the respective holding arms 185a, 185b and 186a, 186b are integrally formed with the intermediate supporting portion 89 so as to be capable of resilient deformation.

As shown in FIGS. 15, 16, and 19, the pair of holding arms 185a, 185b of the holding portion 185 hold the signal processing IC 66 of the sensor circuit structure 61 so as to embrace the same. The holding arms 186a, 186b of the holding portion 186 hold the auxiliary signal processing IC 76 of the sensor circuit structure 71 so as to embrace the same.

A pair of snap strips 187a, 187b are formed on the lower base portion 86 of the resin holder 85A. The pair of snap strips 187a, 187b are formed integrally with the lower base portion 86 so as to project in the directions opposite from each other. The pair of snap strips 187a, 187b are formed on the lower base portion 86 so as to be capable of resilient deformation, and, as shown in FIG. 16 and FIG. 18, snap-fitting the resin holder 85A to a mounting section 81b of the terminal lead structure 80A while being resiliently deformed. The terminal lead 80b is formed with one positioning hole 82c and the holder 85A is formed with one positioning projection 86a, so that the holder 85A is positioned on the terminal lead structure 80A by fitting the positioning projection 86a into the positioning hole 82c.

According to the terminal lead structure 80A in the second embodiment, arrangement of the terminal leads 80a-80d is changed from that of the terminal lead structure 80 in the first embodiment. The terminal leads 80c, 80d are arranged so as to align on one side of the terminal lead 80a which receives the supply of power source voltage and the terminal lead 80b which has the GND potential. On the mounting section 81b of the terminal lead structure 80A, the output terminal lead 68c of the sensor circuit structure 61 is connected to the terminal lead 80c, and the output terminal lead 78c of the sensor circuit structure 71 is connected to the terminal lead 80d by, for example, electrically welding, so that the output A and the output B of the sensor circuit structures 61, 71 are supplied to the terminal leads 80c, 80d.

In the terminal lead structure 80A, the inclined section 81c between the terminal leading section 81a and the mounting section 81b is eliminated. Although the connecting strips 84 are not shown in the drawing, the frame portion 83 surrounds the terminal leads 80a-80d as in the case of the terminal lead structure 80 in the first embodiment, and is to be removed after the resin mold body 90 is molded.

In the second embodiment, the signal processing ICs 66, 76 can easily be held by the respective holding arms 185a, 185b, 186a, 186b of the holding portions 185, 186, and the resin holder 85A can easily be secured to the terminal lead structure 80A by the snap strips 187a, 187b. In the second embodiment in which the snap strips 187a, 187b are used, the positioning projection 86a must simply be fitted into the positioning hole 68c, and caulking by heat is not necessary.

The intake-air control device for an internal combustion engine according to the invention can be used, for example, as an intake-air control device for an internal combustion engine which is to be mounted to an automotive vehicle.

What is claimed is:

1. An intake-air control device for an internal combustion engine comprising:
    a throttle valve for controlling the amount of intake-air into the internal combustion engine by being rotated about a throttle shaft arranged in an air-intake pipe of the internal combustion engine; and
    a throttle position sensor for detecting the rotational position of the throttle valve, wherein the throttle position sensor includes magnetic field generating means that rotates together with the throttle valve and generates a detecting magnetic field in which the direction of magnetic field varies according to the rotation thereof and a magnetic field detecting assembly arranged so as to oppose to the magnetic field generating means,
    wherein the magnetic field detecting assembly of the throttle position sensor includes a plurality of terminal leads, a resin holder secured on the plurality of terminal leads, a sensor member arranged in the detecting magnetic field and generates a sensor output according to the direction of the magnetic field, and a resin mold body including the plurality of terminal leads, the resin holder and the sensor member are insert-molded,
    the resin holder has a supporting surface positioned on a plane intersecting substantially orthogonally to an axial line of the throttle shaft,
    the sensor member includes a resin mold coat having first and second main surfaces opposing substantially in parallel with each other, and
    the sensor member is held in the resin mold body with the first main surface of the resin mold coat being in contact with the supporting surface of the resin holder.

2. The intake-air control device for an internal combustion engine according to claim 1, wherein the sensor member of the throttle position sensor further includes a pair of projections projecting from the resin mold coat in the direction substantially in parallel to the first and second main surfaces, the pair of projections project from the resin mold coat in the directions oppose to each other.

3. The intake-air control device for an internal combustion engine according to claim 1, wherein at least part of the second main surface of the sensor member of the throttle position sensor is exposed from the resin mold body.

4. The intake-air control device for an internal combustion engine according to claim 1, wherein the magnetic field detecting assembly of the throttle position sensor further includes a signal processing IC connected to the sensor member, the resin holder further has a second supporting surface located on a plane which extends substantially in parallel to the axial line of the throttle shaft, and the signal processing IC is held in the resin mold body in contact with the second supporting surface of the resin holder.

5. The intake-air control device for an internal combustion engine according to claim 4, wherein the resin holder includes a holding arm for holding the signal processing IC.

6. The intake-air control device for an internal combustion engine according to claim 1, wherein the magnetic field detecting assembly of the throttle position sensor further includes an auxiliary sensor member that is arranged in the detecting magnetic field and generates a sensor output according to the direction of the magnetic field, the resin holder further has an auxiliary supporting surface substantially in parallel with the supporting surface, the auxiliary sensor member includes a resin mold coat having first and second main surfaces opposing substantially in parallel with each other and is held in the resin mold body with its first main surface in contact with the auxiliary supporting surface of the resin holder.

7. The intake-air control device for an internal combustion engine according to claim 6, wherein the auxiliary resin mold coat of the auxiliary sensor member is arranged so as to oppose the resin mold coat of the sensor member, and the resin mold body is filled between the resin mold coat of the sensor member and the resin mold coat of the auxiliary sensor member.

8. The intake-air control device for an internal combustion engine according to claim 6, wherein the resin mold body includes a first exposure hole for exposing at least part of the second main surface of the sensor member and a second exposure hole for exposing part of the second main surface of the auxiliary sensor member.

9. The intake-air control device for an internal combustion engine according to claim 6, wherein the magnetic field detecting assembly of the throttle position sensor further includes an auxiliary signal processing IC connected to the auxiliary sensor member, and the resin holder further includes a holding arm for holding the auxiliary signal processing IC.

10. The intake-air control device for an internal combustion engine according to claim 1, wherein the resin mold coat of the sensor member of the throttle position sensor has a coefficient of linear expansion approximate to that of the resin mold body.

11. The intake-air control device for an internal combustion engine according to claim 1, wherein the magnetic field detecting assembly of the throttle position sensor further includes positioning means for positioning at least one terminal lead of the plurality of terminal leads and the resin holder.

12. The intake-air control device for an internal combustion engine according to claim 11, wherein the positioning means includes a positioning projection formed on the resin holder, and the positioning projection is caulked to at least one of the terminal leads by heat.

13. The intake-air control device for an internal combustion engine according to claim 1, wherein the resin holder further includes a pair of snap strips, and the resin holder is snap-fitted on the plurality of terminal leads by the pair of snap strips.

* * * * *